Feb. 6, 1962   E. B. STECHER   3,019,904
AVIATION FUEL FILTER
Filed Aug. 14, 1959   2 Sheets-Sheet 1

INVENTOR
EDWARD B. STECHER
BY
ATTORNEYS

3,019,904
AVIATION FUEL FILTER
Edward B. Stecher, 705 S. Wayne St., Arlington, Va.
Filed Aug. 14, 1959, Ser. No. 833,890
1 Claim. (Cl. 210—312)
(Granted under Title 35, U.S. Code (1952), sec. 266)

The invention described herein may be manufactured and used by or for the Government of the United States of American for governmental purposes without the payment of any royalties thereon or therefor.

This invention relates to a fuel filter and more particularly to a fuel filter particularly adapted for removing water and other foreign matter from fuels.

The separation of water from fuels, particularly aviation gasoline, is a problem of long standing. Fuel having even small amounts of water entrained in it represents an aviation hazard because as the temperature of the fuel is lowered, as for example when an airplane gains altitude, the water crystallizes out of the fuel and plugs screens, filters and other parts of the fuel system of the plane so that power plant failure and destruction of the plane may result.

In accordance with the instant invention the fuel filter comprises a casing or tank member having a plurality of filter sections contained therein. Each of the filter sections essentially comprises a plurality of screen members having sandwiched therebetween a quantity of filter material adapted to separate water from gasoline as the combination passes through the filter section. The structure further includes means for admitting unfiltered gasoline into the tank and for allowing exit of the filtered gasoline from the tank, after the water has been separated therefrom. In addition, the instant invention is of course also adapted to remove other foreign matter from fuels.

It is accordingly an object of this invention to provide a reliable and practical means for removing water from fuels.

Another object of this invention is to provide a means for removing water from fuel regardless of the minuteness of the amount of water present in said fuel.

A further object of this invention is to provide a water-fuel separator for removing water from fuels, utilizing filter elements that are readily removable from the separator so that they may be reconditioned and/or replaced.

Still another object of this invention is to provide a water-fuel separator adapted to separate water from fuel wherein the water is coalesced to form fine droplets that accumulate on the bottom of the separator and thence is drained off.

Other objects and many of the attendant advantages of this invention will be readily appreciated as the same becomes better understood by reference to the following detailed description when considered in connection with the accompanying drawings, wherein.

Figure 1:
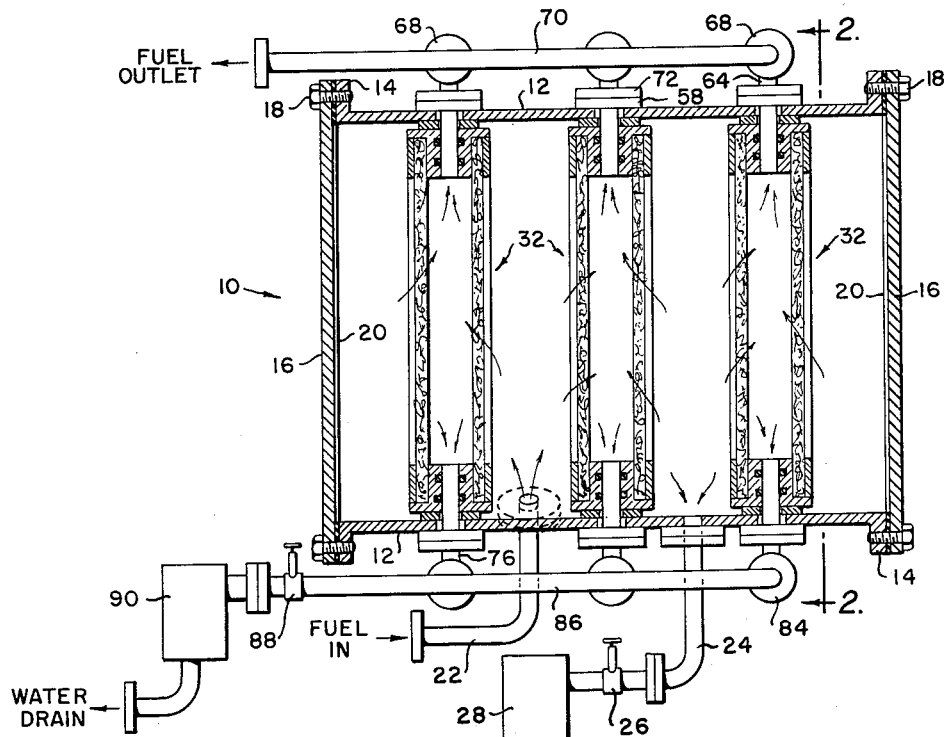
FIG. 1 is a longitudinal, sectional view of a water-fuel separator constructed in accordance with the instant invention.
Figure 2:
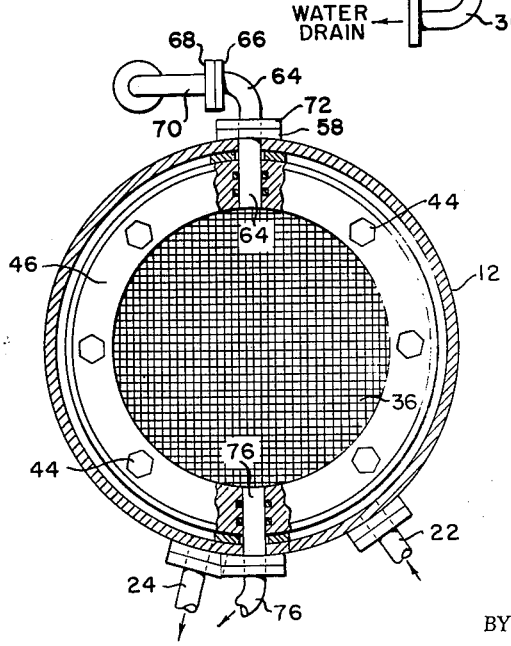
FIG. 2 is a sectional view taken on line 2—2 of FIG. 1.
Figure 3:
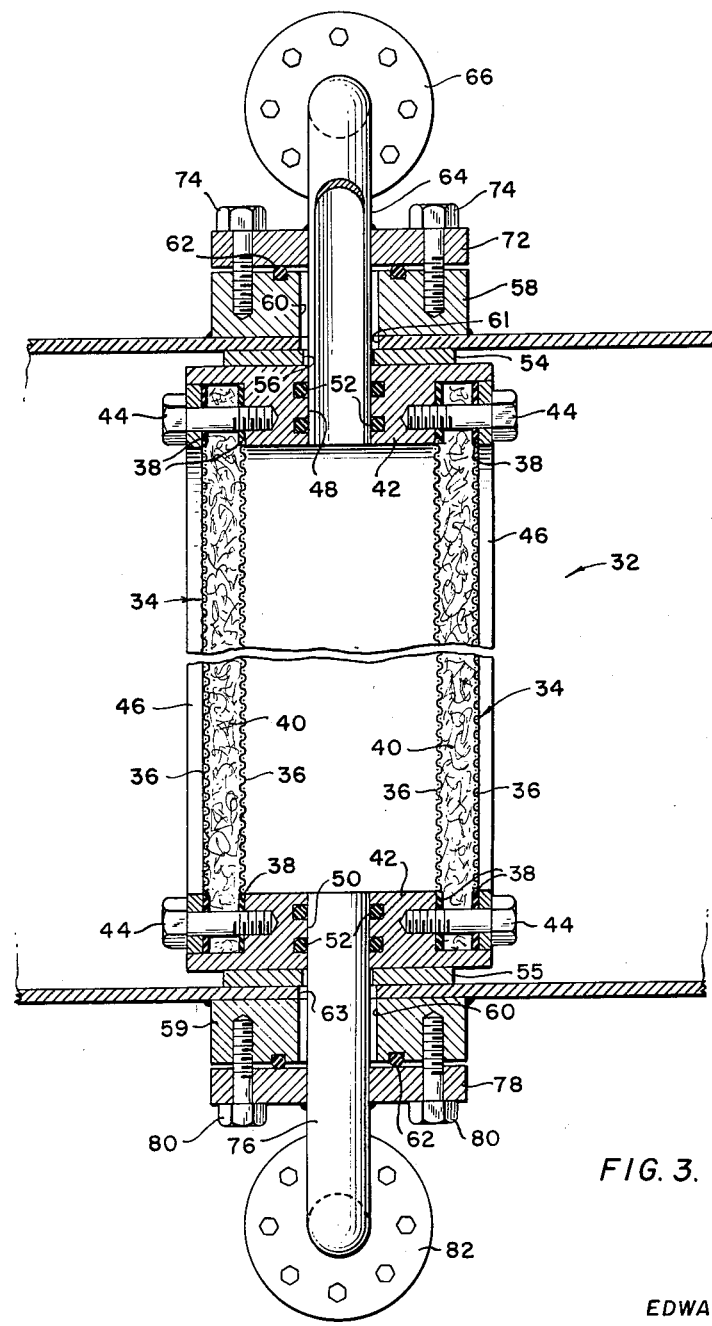
FIG. 3 is an enlarged sectional view of one of the filter sections shown in FIG. 1.

Referring to the drawings wherein like reference characters designate like corresponding parts throughout the several views, there is shown in FIG. 1 a water-fuel separator 10, hereinafter referred to simply as a water separator.

The instant water separator 10 comprises a tubular shell 12 having outwardly turned flanges 14 at its opposite ends. The opposite ends of the shell 12 are closed by a pair of cover plates 16 bolted to the flanges 14 by a plurality of bolts 18, with a gasket 20 being interposed between the respective cover plates 16 and the respective flanges 14.

The shell 12 further includes a fuel inlet pipe 22 opening within said shell, and a water drainage pipe 24 having one end opening within the shell and having in its line a pipe-line closure valve 26. The outside end of the water drainage pipe 24 is connected to a drainage trap 28 of conventional construction. The drainage trap is adapted to entrap water draining through the pipe 24 until a predetermined amount accumulates in the trap and then allows said water to drain from the trap through a pipe 30, thereby preventing escape of fuel through the pipe 24 and the trap 28, under normal conditions. It is emphasized that any type of drainage trap may be utilized and for that matter any kind of receptacle can be substituted for the drainage trap.

The actual filter mechanism comprises a plurality of filter sections 32 mounted within the shell 12. It is pointed out that there may be any number of such filter sections 32 but for the sake of simplicity, in the instant illustration, three have been shown.

Each filter section 32 comprises a pair of filter leaves 34. Each of the filter leaves 34 comprises a pair of spaced, parallel porous screen elements 36 which may be made of wire mesh or any other closely woven porous material. Each of the screen elements 36 has a neoprene ring 38 embedded therein around the periphery thereof. In addition a quantity of filter material 40 is supported between each pair of screen elements 36. The filter material 40 may be in the form of any type of porous closely packed material, an example of which is a felt-like arrangement of a quantity of tetrafluoroethylene, commonly sold under the trademark Teflon.

In each of the filter sections 32 the respective filter leaves 34 are held in parallel spaced relation relative to one another by being clamped at their periphery to an annular support 42. More specifically, the filter leaves 34 each rest, at their periphery, within an annular recessed area formed at the respective side edges of the support ring 42, and are clamped to said ring by a plurality of bolts 44 which extend through the peripheral, neoprene treated edge 38 of the respective filter leaves and are threaded into the support-ring 42. In order to prevent abrasion of the peripheral edges of the filter leaves 34, an annular ring 46 is interposed between the head of the respective bolts 44 and the immediately adacent periphery 38 of the respective filter leaves 34.

Each of the support rings 42 is provided with a hole 48 extending therethrough adjacent the uppermost side of the filter 10, as viewed in FIG. 1, and a second hole 50 extending therethrough adjacent the lowermost point on the support ring. Each of the holes 48 and 50 is provided with a pair of annular, spaced recesses in each of which is carried an O-ring seal 52. In addition, each of the support rings 42 is slightly spaced from the interior of the shell 12 by a pair of annular spacer rings 54 and 55, each having a hole 56 extending through the center thereof and being of slightly larger diameter than the holes 48 and 50.

On the upper and lower exterior of the shell 12, adjacent the location of each of the filter sections 32 there are fixedly mounted a pair of annular bosses 58 and 59 each having a hole 60 extending through the center thereof, in alignment with the holes 48 and 50 and a pair of holes 61 and 63 in the shell 12. Each of the bosses 58 and 59 is provided with an annular recess having therein an O-ring seal 62.

Fuel leaves each of the filter sections 32 through a tube 64 having its innermost end removably located within the hole 48 in the support ring 42 and sealed relative to said ring by the O-rings 52. At its outermost end the tube 64 is provided with a coupling flange 66 adapted to be connected to a coupling flange 68 connected to an outlet tube 70. The tube 64 is provided, adjacent its outermost end, with an annular, fixedly mounted flange 72 adapted to be clamped to the boss 58 by a plurality of bolts 74 having their respective ends threaded into said boss. In this manner each of the tubes 64 is removably clamped to a filter section 32.

While the foregoing description of the connection between the filter sections 32 and the respective outlet tubes 64 deals with the connection whereby fuel is allowed to escape from the filter 10, a substanially identical connection is utilized at the lower end of each of the filter sections 32 in conjunction with the hole 50 to removably connect a water escape tube 76 to each of the filter sections 32. The tube 76 is removably mounted in the hole 50 and has attached thereto, intermediate its outer end, a flange 78 adapted to be attached to the boss 59 by a plurality of bolts 80 threaded into said boss. The outer end of each tube 76 is provided with a coupling flange 82 adapted to be clamped to a cooperating flange 84 attached to a water drain pipe 86. The drainage pipe 86 has therein a closure valve 88 intermediate the ends thereof, and at its outer end a conventional drainage trap 90 of the same construction as the drainage trap 28 referred to above.

It is emphasized that instead of the drainage traps 28 and 90, recourse may be had to a simple container having a drainage port thereon so that water may be released therefrom at periodic intervals of time. The aforementioned drainage traps have not been described in detail since they are conventional and well known in the art, being so constructed as to allow water to escape therefrom when said water reaches a predetermined level in the trap, and at the same time prevent escape from the filter of the fuel contained therein.

During the operation of the instant invention, fuel is fed into the filter 10 through the tube 22, and as the shell 12 begins to fill fuel is forced thorugh the respective filter leaves 34 into the space between the leaves in each filter section 32. Of course entry of water into the space between the filter leaves 34 is prevented by the action of the mesh screens 36 in combination with the filter material 40. The water will cling to the outside of each of the filter leaves 34, and as it accumulates will drain to the bottom of the shell 12 draining from said shell through the pipe 24 and into the drainage trap 28.

Any water which may pass through the respective leaves 34 into the space therebetween will, since water is heavier than most gasolines, sink to the bottom of each of the filter sections 32 and drain therefrom through the respective tubes 76 into the pipe 86 and thence to the trap 90.

It is emphasized that the instant filter 10 is designed to remove most of the water entrained in the fuel contained in the filter before said fuel passes into the space between the respective filter leaves 34 in each filter section 32. The water drains from the filter 10 through pipe 24, while any residual water left in the fuel accumulates within each of the filter sections 32, draining therefrom through the respective tubes 76.

There is very little likelihood that fuel will drain through the respective drainage tubes 24 and 76, since water will accumulate in the bottom filter 10 by virtue of the fact that it is heavier than the fuel contained therein, said fuel floating on the top of said water and leaving the filter, after filtration thereof, through the respective tubes 64.

Thus the instant invention provides a means for readily and thoroughly separating entrained water from aviation fuel and the like by means of a filter system that is relatively simple in construction and which contains filter elements that may be readily replaced and/or cleaned when such need arises.

It should be understood, of course, that the foregoing disclosure relates to only a preferred embodiment of the invention and that numerous modifications or alterations may be made therein without departing from the spirit and scope of the invention as set forth in the appended claim.

What is claimed is:

A water-fuel separator comprising a horizontal tank having a fuel inlet in the lower portion thereof, and a plurality of fuel outlet tubes located in the upper portion of the tank, each of said fuel outlet tubes being removably connected to the tank so as to be rendered removable from the interior thereof, a plurality of substantially vertical filter cartridges equal in number to the outlet tubes in the tank, each of said filter cartridges comprising a pair of spaced, fixedly mounted porous leaves arranged in parallel relation to one another, an annular member interposed between said leaves and to which the peripheral portion of each of said pair of leaves is fixedly connected in peripheral moisture proof relation therewith, each of said annular members having an opening formed therein and extending radially thereof adjacent the upper portion thereof, said fuel outlet tubes being mounted within said openings, whereby fuel must pass through said filter leaves before passing out of the water-fuel separator, each of said annular members having a second opening formed therein adjacent the lower portion thereof, a water drain tube removably mounted in the opening in the lower portion of each of said annular members and extending outwardly of the tank whereby water accumulating between the filter leaves in any one cartridge is adapted to be drained from the tank; and a water outlet within the lower portion of said tank located exteriorly of said filter cartridges whereby water accumulating on the exterior of said cartridges is adapted to be drained from the bottom of the tank; each of said porous filter leaves comprising a pair of porous members having interposed therebetween a quantity of porous, felt-like filter material, said porous members each haivng a neoprene ring embedded in the peripheral portion thereof and said neoprene treated peripheral portion of each of the filter leaves being clamped to a side surface of each of said annular members in moisture-tight relation therewith.

References Cited in the file of this patent
UNITED STATES PATENTS

| | | |
|---|---|---|
| 604,568 | Raab | May 24, 1898 |
| 1,787,577 | Hills | Jan. 6, 1931 |
| 2,657,808 | Mankin | Nov. 3, 1953 |
| 2,707,563 | Kasten et al. | May 3, 1955 |
| 2,732,077 | Robinson | Jan. 24, 1956 |

OTHER REFERENCES

Technique of Organic Chemistry, by Arnold Weissberger, editor, vol. III, Second Completely Revised and Augmented Edition, Part I, Separation and Purification. Page 696 is cited.